March 26, 1935.  R. F. WALTERS  1,995,370
SNAP FASTENER ATTACHED CLIP MEMBER
Filed Jan. 21, 1931
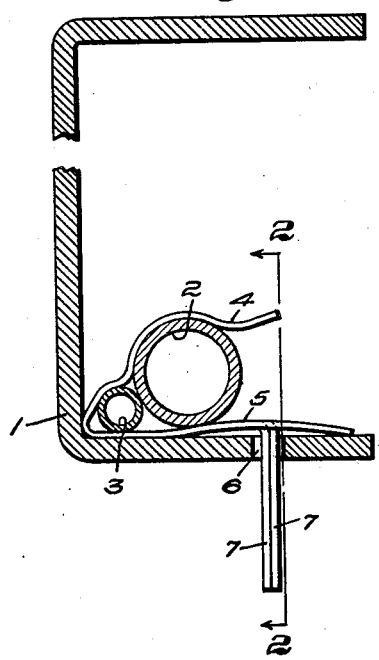
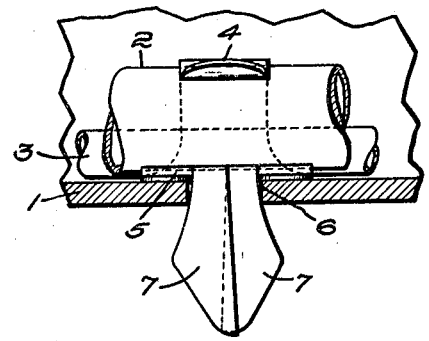
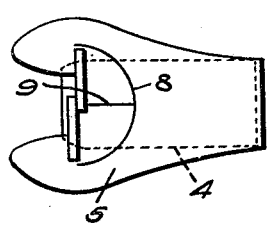
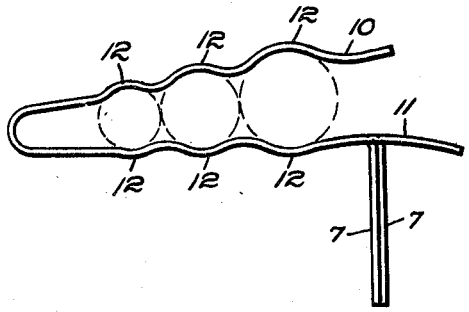
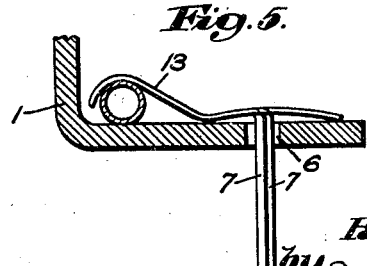
Inventor:
Rollo F Walters
by Emery, Booth, Varney & Townsend
Attys Patented Mar. 26, 1935

1,995,370

UNITED STATES PATENT OFFICE 1,995,370

SNAP FASTENER ATTACHED CLIP MEMBER

Rollo F. Walters, Detroit, Mich., assignor to United-Carr Fastener Corporation, Cambridge, Mass., a corporation of Massachusetts Application January 21, 1931, Serial No. 510,225

9 Claims. (Cl. 24—73)

My invention aims to provide improvements in snap fastener attached clip members for holding various elements in a given position and installations thereof.

In the drawing which illustrates preferred embodiments of my invention:—

Figure 1 is a section through an installation embodying my invention and showing one type of clip member in elevation;

Fig. 2 is a section taken on the line 2—2 of Figure 1;

Fig. 3 is a plane view of the clip member shown in Figs. 1 and 2;

Fig. 4 is a side elevation of a modified form of clip; and

Fig. 5 is a sectional installation showing another form of clip device.

My invention is particularly, though not exclusively, useful in connection with securing conductor members, such as gasoline pipes, air pipes, rods and wires, to structures such as automobile bodies and frames.

In the particular embodiment of my invention selected for illustration by the drawing I have shown in Figs. 1 and 2 a channel iron 1 of a motor vehicle frame, or the like, in the hollow of which I have shown a gasoline pipe 2 and an air pipe 3 secured in position by means of a clip-like device. The gasoline pipe 2 is used to convey gasoline from the gasoline storage tank (not shown) to the carburetor (not shown) and the air pipe 3 is used in connection with the operation of a vacuum operated windshield cleaner, as will be well understood.

By using fastening devices adapted to be detachably secured to the frame structure, as by snap fastener elements, I have found that the conductor members may be easily attached and removed. The clamping means or head portion of each of the fastening devices may be variously constructed and, therefore, I have shown only a few illustrations.

The fastening device shown in Figs. 1, 2 and 3 comprises a clip-like member having a clip or hook-shaped portion formed by bending a strip of metal to form two fingers 4 and 5. Each finger is connected at one end to the other finger while the other ends remain free to permit expansion and contraction when a pipe is being inserted between or withdrawn from the fingers. The shape of each finger may vary so that different sized pipes may be accommodated, as shown in Figs. 1 and 4. Furthermore, one or both of the fingers 4 and 5 are provided with portions to fit the contour of the conductor member.

The clip device, shown in Figs. 1, 2 and 3, has its finger 4 so shaped and spaced (Figure 1) from the finger 5 that it will engage both the small air pipe 3 and the relatively larger gasoline pipe 2 and the finger 5 which is in the nature of a base portion for engagement with the channel iron, is slightly curved longitudinally thereby to cooperate with the finger 4 and hold the pipes 2 and 3 securely.

Any suitable snap fastening means may be used to secure the clip members to the supporting structure. However, in Figs. 1 and 2 I have shown the snap fastening means as being in the form of a stud extending from the finger 5 through an aperture 6 in the channel iron 1. The stud member is provided by pressing two engaging members 7—7 from the finger 5 and having them extend at right angles thereto. These engaging members 7—7 are permitted to yield by cutting slots 8 and 9 in the finger 5 (Fig. 3) so that when they are engaged with the wall surrounding the aperture 6 they may move toward each other to snap into the aperture in the usual manner.

The clip device shown in Fig. 4 has fingers 10 and 11 which are longer than those shown in the device illustrated in Figs. 1 through 3 so that they may receive a larger number of conductor members between them. Furthermore, the fingers 10 and 11 are very similar to each other in shape, each being provided with a series of arches 12 to conform with and hold the pipes, wires or the like in place, as shown in dotted lines.

In the installation shown in Fig. 5 the clip device has but a single finger 13 and is particularly adapted for holding in place a single conductor member.

The finger 5 from which the stud portion projects is arched longitudinally so that it may yield and cooperate with the edges of the portions 7—7 to hold the device securely in position against the supporting structure 1, as best shown in Fig. 1. It will be readily understood that, since the finger 5 may flatten, the device is adapted to be attached to structures of various thicknesses and prevent looseness which might occur, especially if the finger 5 were flat and the structure 1 were of relatively greater thickness than that shown in the drawing. It is desirable to have the point of contact between the structure 1 and the edges of the portions 7—7 as near the finger 5 as possible and, therefore, the flexibility of the arched finger permits this contact to remain substantially constant over a wide range of variations in the thickness of the material.

My invention is decidedly useful because it can be attached and removed very readily, thereby making it less expensive to install wires, pipes and the like in motor vehicles. No riveting or bolting of clips into place is necessary and furthermore the conductors may in some instances be removed from a clip, or clips, without removing the clip, or clips, from the frame structure.

While I have illustrated and described preferred embodiments of my invention, I do not wish to be limited thereby, because the scope of my invention is best defined by the following claims.

I claim:

1. A conduit-holding clip device having a conduit-engaging portion provided with a pair of spaced finger portions shaped to receive and hold a conduit and the like between them and snap fastening means comprising cooperating yieldable portions extending from one finger only and adapted to attach the device to a supporting structure.

2. A conduit-holding clip device having a pair of spaced spring finger portions joined together at one end and adapted to receive and hold a conduit or the like between them, transversely formed recess means provided in at least one of said finger portions for holding the conduit in position between said fingers and a snap fastening means formed as an integral part of the device for attaching it to a supporting structure.

3. A conduit-holding clip device having a pair of spaced spring finger portions joined together at one end and having transverse grooves adapted to receive and hold more than one conduit and the like between said fingers and a snap fastening means formed as a part of the device and extending from one of said fingers for attaching said clip device to a supporting structure.

4. A conduit-holding clip device having a pair of spaced spring finger portions joined together at one end and shaped to receive and hold a conduit and the like between them and a snap fastener stud means comprising a pair only of yieldable portions extending directly from one of the spring finger portions and having converging and diverging edges for detachably securing the device to a supporting structure.

5. A conduit-holding clip device having a conduit holding and engaging portion, a snap fastening means provided as a part of the device and adapted to secure it to a supporting structure and a yieldable arched support-engaging portion provided as a part of the conduit holding and engaging portion adjacent to the point where the snap fastening means extends from the device for the purposes described.

6. A conduit-holding clip device having a pair of spaced spring finger portions adapted to receive and hold the conduit and the like between them and a snap fastener stud means comprising a pair only of yieldable portions extending from one of the spring finger portions and having converging and diverging edges for detachably securing the device to a supporting structure, and said finger from which said fastener means extends being arched longitudinally for the purposes described.

7. A conduit-holding clip device having a pair of spaced spring finger portions adapted to receive and hold a conduit and the like between them and a snap fastener stud means comprising a pair only of relatively movable portions extending from one of the spring finger portions and having converging and diverging edges for detachably securing the device to a supporting structure, and said finger from which said projections extend being slit to permit movement of said relatively movable portions.

8. A spring fastener designed to attach elements in the form of tubes, rods, conduits or the like to a metallic supporting structure, consisting of a head in the form of a hook shaped to snugly fit the element, and an expansible and contractible shank including two spring arms each of which includes means to hold the fastener engaged in an opening in the supporting structure when snapped therethrough.

9. A device of the class described formed from a single piece of sheet metal and having a portion of greater width than thickness shaped and arranged to hold a conduit and the like, a support-engaging portion connected to said first mentioned portion and cooperating therewith to hold said conduit and the like, said device having a pair of thin edgewisely movable socket-engaging projections extending from the support-engaging portion at substantially a right angle to the plane thereof and said socket-engaging projections being provided with edges shaped to make snap fastening engagement with suitable socket means.

ROLLO F. WALTERS.